(12) United States Patent
Wang et al.

(10) Patent No.: US 12,227,213 B2
(45) Date of Patent: Feb. 18, 2025

(54) TRAIN BRAKING CONTROL METHOD AND DEVICE SUPPORTING MULTI-STAGE DECELERATION, AND STORAGE MEDIUM

(71) Applicant: CASCO SIGNAL LTD., Shanghai (CN)

(72) Inventors: Xuchao Wang, Shanghai (CN); Xinjun Lv, Shanghai (CN); Ming Chang, Shanghai (CN); Xing Fang, Shanghai (CN); Yong Ye, Shanghai (CN); Jingen Hu, Shanghai (CN)

(73) Assignee: CASCO SIGNAL LTD., Shanghai (CN)

( * ) Notice: Subject to any disclaimer, the term of this patent is extended or adjusted under 35 U.S.C. 154(b) by 0 days.

(21) Appl. No.: 18/013,551

(22) PCT Filed: Nov. 4, 2021

(86) PCT No.: PCT/CN2021/128599
§ 371 (c)(1),
(2) Date: Dec. 29, 2022

(87) PCT Pub. No.: WO2023/050527
PCT Pub. Date: Apr. 6, 2023

(65) Prior Publication Data
US 2024/0278816 A1    Aug. 22, 2024

(30) Foreign Application Priority Data
Sep. 28, 2021 (CN) .......................... 202111157842.4

(51) Int. Cl.
*B61L 27/20* (2022.01)
*B60T 7/12* (2006.01)
*B61L 15/00* (2006.01)

(52) U.S. Cl.
CPC .............. *B61L 27/20* (2022.01); *B60T 7/126* (2013.01); *B61L 15/0062* (2024.01); *B60T 2250/02* (2013.01); *B60T 2250/04* (2013.01)

(58) Field of Classification Search
CPC ...... B61L 27/20; B61L 27/16; B61L 15/0062; B61L 15/0058; B61L 23/08; B60T 7/126; B60T 2250/02; B60T 2250/04
(Continued)

(56) References Cited

FOREIGN PATENT DOCUMENTS

CN         102897193      *   6/2016   .............. B60L 23/00

OTHER PUBLICATIONS

"International Search Report (Form PCT/ISA/210) of PCT/CN2021/128599," mailed on Jun. 23, 2022, pp. 1-5.
(Continued)

*Primary Examiner* — Hai H Huynh
(74) *Attorney, Agent, or Firm* — JCIPRNET

(57) ABSTRACT

A train braking control method and device supporting multi-stage deceleration, and a storage medium are provided. The method includes the following steps: calculating an initial value of kinetic energy of a train; calculating work of traction force of the train in a process from an initial position to traction removal; calculating work of gravity force of the train in a process from the initial position to a stop; calculating work of braking force of the train in a process from a braking application position to the stop; calculating maximum allowable kinetic energy of the train among all restriction points from the initial position to a stop point; obtaining kinetic energy of the train according to the following formula, determining whether the kinetic energy of the train exceeds the maximum allowable kinetic energy at the restriction point, if so, triggering emergency braking of the train, or else, operating the train normally.

12 Claims, 3 Drawing Sheets

(58) Field of Classification Search
USPC .......................... 701/19, 20, 70, 76, 92, 97
See application file for complete search history.

(56) References Cited

OTHER PUBLICATIONS

"Written Opinion of the International Searching Authority (Form PCT/ISA/237) of PCT/CN2021/128599," mailed on Jun. 23, 2022, pp. 1-4.

\* cited by examiner

TRAIN BRAKING CONTROL METHOD AND DEVICE SUPPORTING MULTI-STAGE DECELERATION, AND STORAGE MEDIUM

CROSS-REFERENCE TO RELATED APPLICATION

This application is a 371 of international application of PCT application serial no. PCT/CN2021/128599, filed on Nov. 4, 2021, which claims the priority benefit of China application no. 202111157842.4, filed on Sep. 28, 2021. The entirety of each of the above mentioned patent applications is hereby incorporated by reference herein and made a part of this specification.

TECHNICAL FIELD

The present invention relates to a train signal control system, and in particular, to a train braking control method and device supporting multi-stage deceleration, and a storage medium.

RELATED ART

In the field of rail transit, an automatic grain protection (ATP) system, as the core of an automatic train control system, is the most important part for ensuring that a train can travel safely.

An ATP method based on energy monitoring is an advanced automatic train protection technique which is generally implemented under the assumption that: a current train issues an emergency braking command, and the train will operate in a manner shown in FIG. 1, with a train displacement as the abscissa, a velocity as the ordinate, and a train locomotive located at the coordinate origin X0. There are three stages from the issuance of the braking command to a stop according to IEEE Std1474.1-1999 (IEEE Standard for Communications-Based Train Control (CBTC) Performance and Functional Requirements), namely, an acceleration stage from X0 to X1, in which a traction force has not been removed, the braking force has not been applied, and the train is under the combined action of the traction force and a gravity force (resulting from a gradient); a coasting stage from X1 to X2, in which the traction force has been removed but the braking force has not been applied, and the train is affected by relations and the gravity force (resulting from the gradient); and an emergency braking stage from X2 to XC, in which the emergency braking has been applied, and the train is under the combined action of an emergency braking force and the gravity force (resulting from the gradient). During the operation of a train, different velocities at X0 correspondingly form an emergency braking trigger curve, as shown in FIG. 2. According to the worst case, the current kinetic energy, as well as the work of traction force, the work of braking force, and the work of gravity force are calculated for the train, and whether corresponding requirements are met when the train reaches a downstream velocity restriction or stop point is determined. If the corresponding requirements are met, safety is considered achieved, or else, emergency braking will be applied immediately to ensure safe stopping.

Based on searches, a Chinese patent with Publication No. CN 102897193B discloses an automatic train protection method based on the principle of conservation of energy. This method is implemented as follows:

the kinetic energy of a train can be obtained according to the formula Ek=Ek0+Wg+Wtraction+Wbraking; whether the kinetic energy of the train exceeds the maximum allowable kinetic energy of a limit point is determined; if so, the emergency braking of the train is immediately triggered; or else, the train operates normally.

In this formula. Ek is the kinetic energy of the train; Ek0 is an initial value of the kinetic energy of the train; Wg is the work of gravity force; Wtraction is the work of traction force; and Wbraking is the work of braking force.

In the existing patent above. Wbraking is calculated using a fixed emergency braking deceleration, and the emergency braking deceleration used during the calculation of Wbraking is the worst value for the train in all velocity and track instances in order to ensure the operational safety of the rain in all instances. However, different emergency braking trigger curves are obtained for the train with respect to different emergency braking forces. When the emergency braking force is high, the velocity of the train drops faster, with a shorter stopping distance; and when the emergency braking force is low, the emergency braking curve descends slowly, with a longer stopping distance as shown in FIG. 3, in which with respect to the same velocity V0 and V0', the safe stopping distance required by a low braking force is from X0 to XC, and the safe stopping distance required by a high braking force is from X0' to XC. That is, the stopping distance required by the high braking force is shorter.

Therefore, the calculation method based on the minimum braking force in the existing patent will lead to low operation velocity of the train and large interval between the trains, which is not conducive to improving the operational efficiency and also leads to other problems.

SUMMARY OF INVENTION

An object of the present invention is to overcome the defects existing in the prior art above, and to provide a train braking control method and device supporting multi-stage deceleration, and a storage medium, whereby different emergency braking forces and corresponding braking decelerations are provided according to different velocity intervals of a train, and the work of emergency braking force is calculated using different decelerations under different circumstances, such that more accurate emergency braking energy can be obtained under the premise of ensuring the safe operation of the train, which shortens the emergency braking distance and improves the operational efficiency of the train.

The object of the present invention can be achieved by means of the following technical solutions.

According to another aspect of the present invention, there is provided a train braking control method supporting multi-stage deceleration. The method includes the following steps:

step 1, calculating an initial value $E_{k0}$ of kinetic energy of a train;

step 2, calculating work of traction force $W_{traction}$ of the train in a process from an initial position to traction removal;

step 3, calculating work of gravity force $W_g$ of the train in a process from the initial position to a stop;

step 4, calculating work of braking force $W_{braking}$ of the train in a process from a braking application position to the stop;

step 5, calculating maximum allowable kinetic energy of the train among all restriction points from the initial position to a stop point;

step 6, obtaining kinetic energy $E_k$ of the train according to the following formula, determining whether the kinetic energy of the train exceeds the maximum allowable kinetic energy at the restriction point, if so, triggering emergency braking of the train, or else, operating the train normally:

$$E_k = E_{k0} + W_g + W_{traction} + W_{braking}.$$

As a preferred technical solution, a calculation formula in step 1 is as follows:

$$E_{k0} = \frac{1}{2} \cdot M_{train} V0^2 + \frac{1}{2} \cdot \frac{1}{R^2} V0^2,$$

in which $E_{k0}$ is the initial value of the kinetic energy of the train, $M_{train}$ is the mass of the train, V0 is an initial velocity of the train, J is a rotational inertia of the train, and R is a wheel radius.

As a preferred technical solution, a calculation formula in step 2 is as follows:

$$W_{traction}(X0 \to X) = \int_{X0}^{X} \left( M_{train} \cdot \Gamma_{traction}(X) + \frac{J}{R^2} \Gamma_{traction}(X) \right) \partial X,$$

in which $W_{traction}$ is the work of traction force, $M_{train}$ is a mass of the train, $\Gamma_{traction}$ is an acceleration provided by the train when a velocity of the train is V (X), J is a rotational inertia of the train, and R is a wheel radius.

As a preferred technical solution, a calculation formula in step 3 is as follows:

$$W_g(X0 \to X) = -M_{train} \cdot g \cdot \int_{X0}^{X} (\text{gradient}(X)) \partial X,$$

in which $W_g$ is the work of gravity force, $M_{train}$ is a mass of the train, g is a gravity acceleration, and gradient (X) is a gradient of a line at X.

As a preferred technical solution, a specific process of step 4 is as follows:

step A, calculating a velocity V reached by the train after a safe response time according to a current velocity of the train;

step B, calculating an emergency braking rate switching point;

step C, calculating the work of braking $W_{bx}$ of the train within a current deceleration interval;

step D, repeating step B to step C after entering a next deceleration interval, until the velocity is zero; and step E, accumulating the work of emergency braking force in all portions to act as total work of braking force $W_{braking}$.

As a preferred technical solution, step A specifically includes:

obtaining the velocity V of the train at the beginning of X2 by using the following formula by stages:

$$V = V0 + \alpha t,$$

in which V0 is a velocity of the train at the beginning of a corresponding stage, and a is a resultant acceleration of the traction force of the train and the gravity force from stage X0 to stage X1, and is a gravity acceleration from stage X1 to stage X2, wherein X0 is a train position at the time when the train issues an emergency braking command; X1 is a position of the train at the time of traction removal; and X2 is a train position of the train at which the braking is applied actually.

As a preferred technical solution, specifically in step B. the train has different emergency braking rates at different operation velocities, with different braking rates corresponding to different decelerations $\beta_x$.

As a preferred technical solution, a calculation formula in step C is as follows:

$$W_{bx} = \int_{Sx0}^{Sxt} \left( M_{train} \cdot \beta_x + \frac{J}{R^2} \beta_x \right) \partial X,$$

in which $M_{train}$ is the mass of the train, J is the rotational inertia of the train, and R is the wheel radius.

As a preferred technical solution, step D specifically includes:

after the velocity of the train decreases to a new deceleration interval by application of emergency braking, $\beta_x$, $S_x$, and $W_{bx}$ are calculated by using new parameters.

As a preferred technical solution, a calculation formula in step E is as follows:

$$W_{bracking} = \sum\nolimits_{0}^{n} W_{bx},$$

in which $W_{bx}$ is the work of braking force during emergency braking of the train.

As a preferred technical solution, the method comprises calculating the work of braking force in an emergency braking process by making full use of accurate braking deceleration values of the train at different velocities and under different track conditions.

According to a second aspect of the present invention, there is provided an electronic device, including a memory storing a computer program thereon and a processor, wherein the processor, when executing the computer program, implements the method as defined.

According to a third aspect of the present invention, there is provided a computer-readable storage medium storing a computer program thereon, wherein the computer program, when executed by a processor, implements the method as defined.

Compared with the prior art, the present invention has the following advantages:

1. the present invention contemplates the difference in emergency braking force at different velocities to improve the accuracy of the work of emergency braking force;
2. the present invention contemplates the difference in braking force under different railway conditions to improve the accuracy of the work of emergency braking force; and
3. the present invention uses the worst case when calculating the braking force for each section to guarantee the safety of train operation.

DESCRIPTION OF EMBODIMENTS

Figure 1:
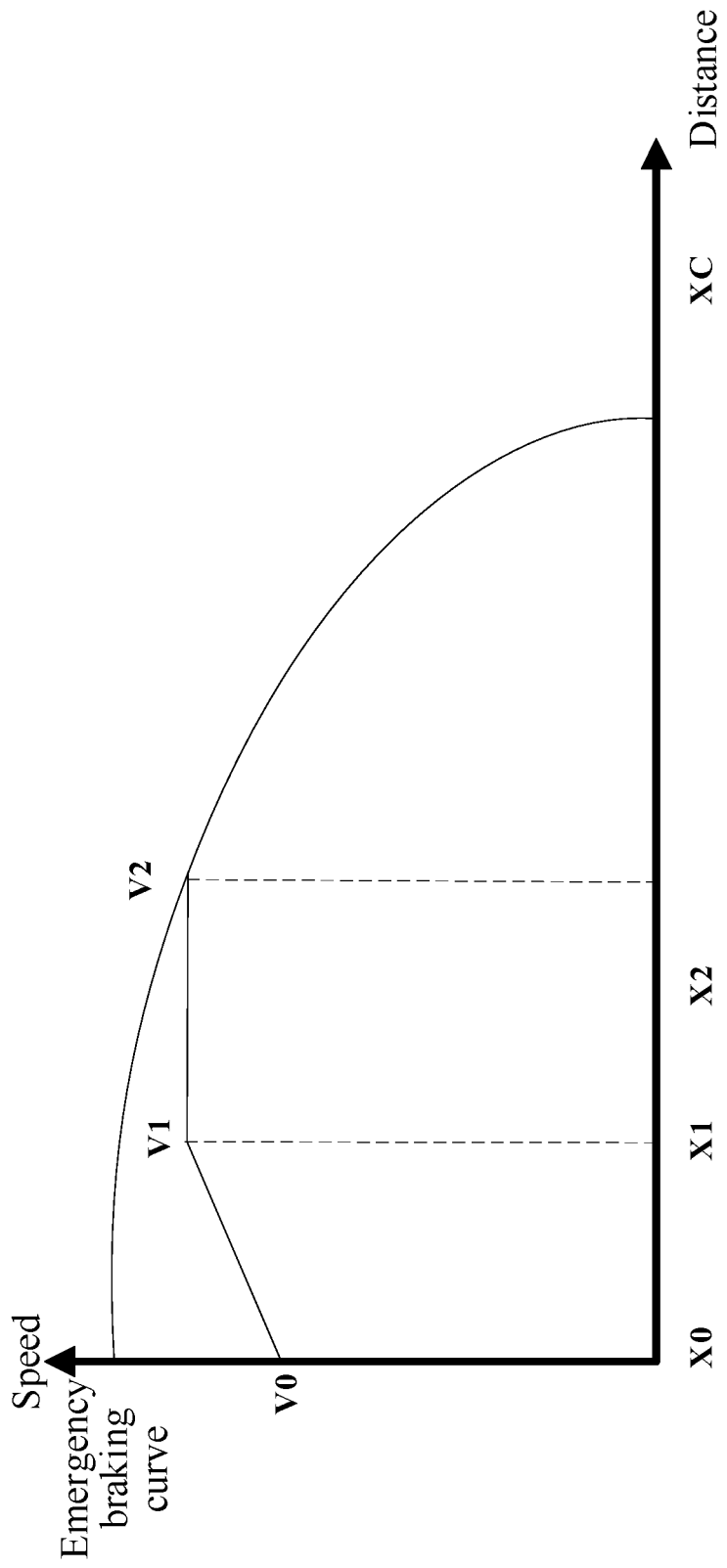
FIG. 1 is a schematic diagram of the operation of a train after emergency braking.
Figure 2:
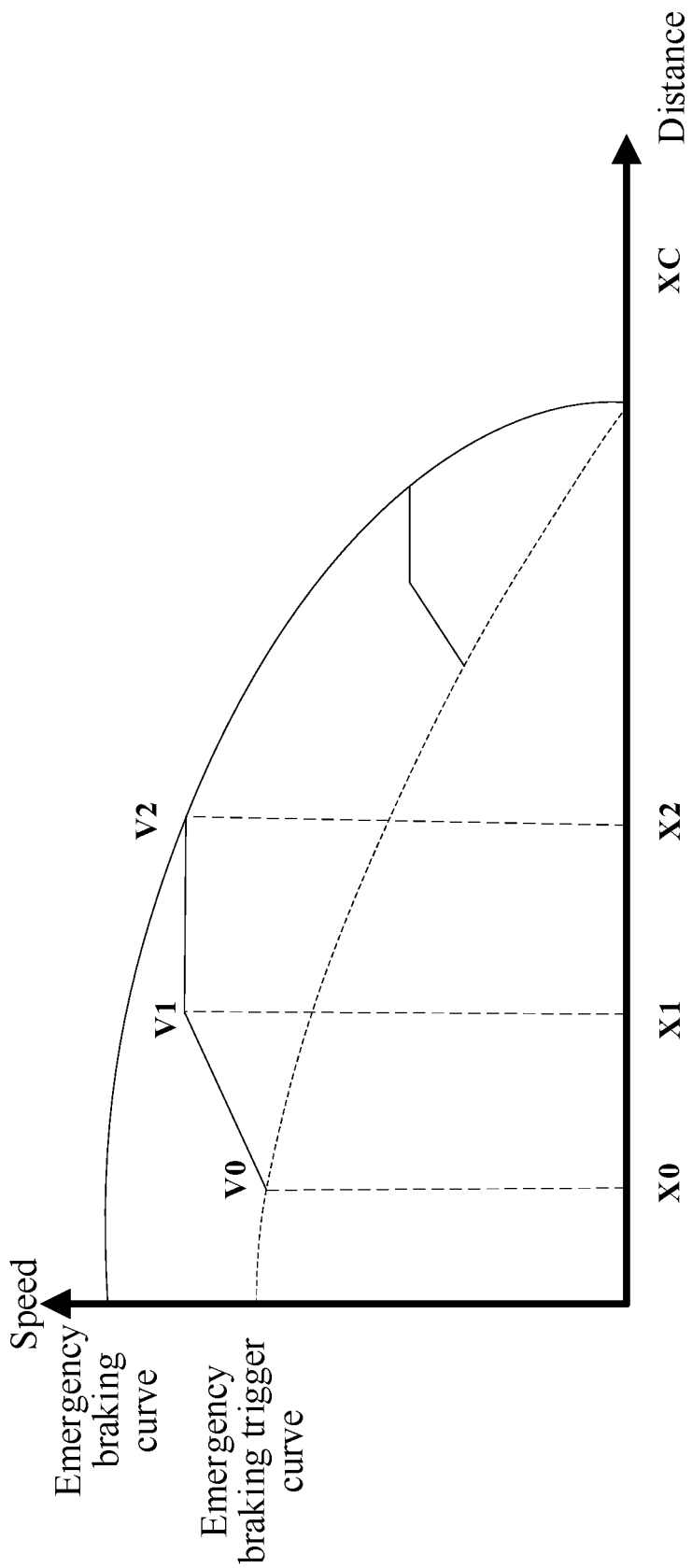
FIG. 2 is a schematic diagram of an emergency braking curve of a train during operation.
Figure 3:
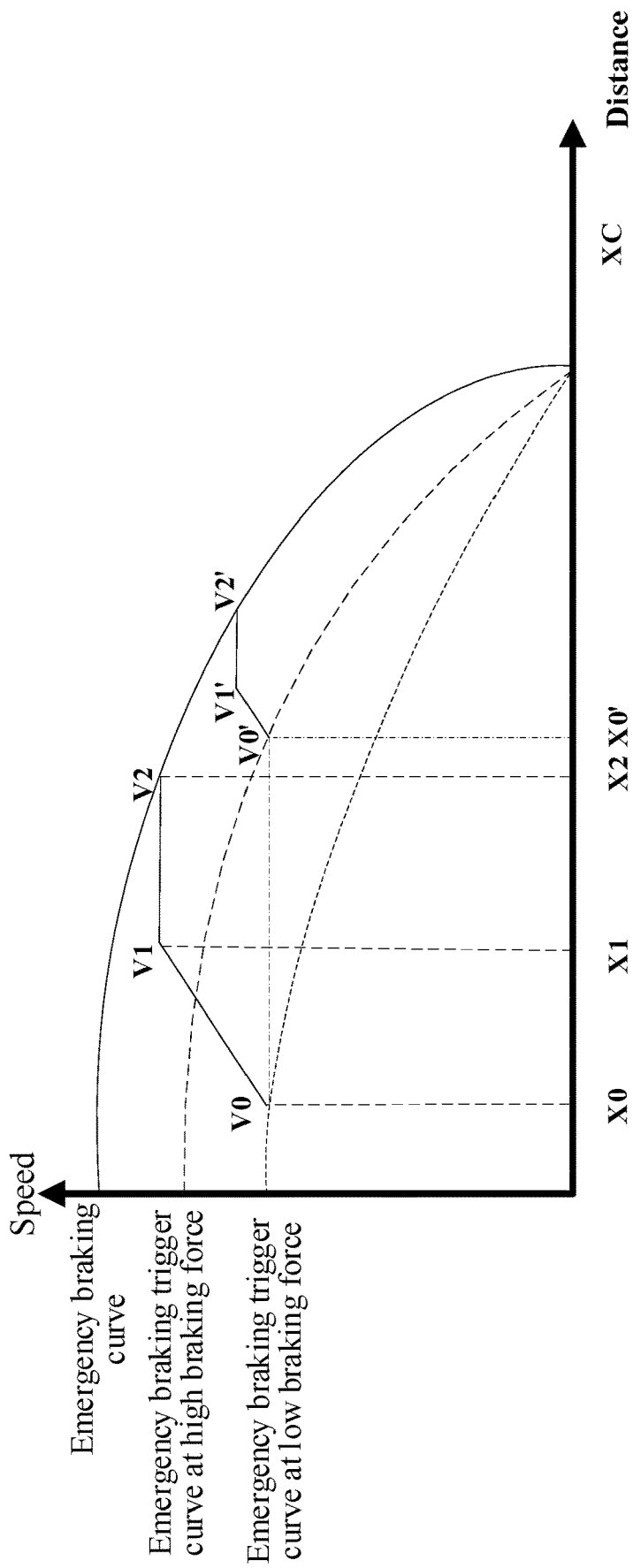
FIG. 3 is a schematic diagram of emergency braking trigger curves corresponding to different braking forces of the train.

The technical solutions in the embodiments of the present invention will be described clearly and completely below in conjunction with the accompanying drawings in the embodiments of the present invention. Obviously, the embodiments described are some instead of all of the embodiments of the present invention. Based on the embodiments in the present invention, every other embodiment obtained by those of ordinary skills in the art without creative labor shall fall within the protection scope of the present invention.

In the train braking control method of the present invention, $E_k = E_{k0} + W_g + W_{traction} + W_{braking}$ is used, in which $E_k$ is the kinetic energy of a train; $E_{k0}$ is an initial value of the kinetic energy of the train; $W_g$ is the work of gravity force; $W_{traction}$ is the work of traction force; and $W_{braking}$ is the work of braking force. The method includes the following steps.

In step 1, an initial value $E_{k0}$ of kinetic energy of a train is calculated as follows:

$$E_{k0} = \frac{1}{2} \cdot M_{train} V0^2 + \frac{1}{2} \cdot \frac{J}{R^2} V0^2.$$

In this formula, $E_{k0}$ is the initial value of the kinetic energy of the train, $M_{train}$ is the mass of the train, V0 is an initial velocity of the train, J is a rotational inertia of the train, and R is a wheel radius.

In step 2, the work of traction force $W_{traction}$ of the train in a process from an initial position to traction removal is calculated as follows:

$$W_{traction}(X0 \to X) = \int_{X0}^{X} \left( M_{train} \cdot \Gamma_{traction}(X) + \frac{J}{R^2} \Gamma_{traction}(X) \right) \partial X.$$

In this formula, $W_{traction}$ is the work of traction force, $M_{train}$ is a mass of the train, Γ_traction is an acceleration provided by the train when a velocity of the train is V(X), J is a rotational inertia of the train, and R is a wheel radius.

In step 3, the work of gravity force $W_g$ of the train in a process from the initial position to a stop is calculated as follow:

$$W_g(X0 \to X) = -M_{train} \cdot g \cdot \int_{X0}^{X} (\text{gradient}(X)) \partial X.$$

In this formula, $W_g$ is the work of gravity force, $M_{train}$ is a mass of the train, g is a gravity acceleration, and gradient (X) is a gradient of a line at X.

In step 4, the work of braking force $W_{braking}$ of the train in a process from a braking application position to the stop is calculated.

This step includes the steps of:

step A, calculating a velocity V reached by the train after a safe response time according to a current velocity of the train;

step B, calculating an emergency braking rate switching point;

step C, calculating the work of braking $W_{bx}$ of the train within a current deceleration interval;

step D, repeating step B to step C after entering a next deceleration interval, until the velocity is zero; and step E, accumulating the work of emergency braking force in all portions to act as total work of braking force $W_{braking}$.

In step 5, the maximum allowable kinetic energy of the train among all restriction points from the initial position to a stop point is calculated as follows:

$$E_{limit} = \frac{1}{2} \cdot M_{train} V_{limit}^2 + \frac{1}{2} \cdot \frac{J}{R^2} V_{limit}^2.$$

In this formula, $E_{limit}$ is a kinetic energy limit value of the train at the restriction point, $M_{train}$ is the mass of the train, $V_{limit}$ is the velocity of the train at the restriction point, J is a rotational inertia of the train, and R is a wheel radius.

In step 6, the kinetic energy of the train may be obtained according to the following formula; whether the kinetic energy of the train exceeds the maximum allowable kinetic energy at the restriction point; if so, the emergency braking of the train is triggered; or else, the train operates normally:

$$E_k = E_{k0} + W_g + W_{traction} + W_{braking}.$$

In step A, calculating a velocity V reached by the train after a safe response time according to a current velocity of the train specifically includes:

three emergency braking stages as shown in FIG. 1.

The velocity V of the train at the beginning of X2 is obtained by using the following formula by stages:

$$V = V0 + \alpha t.$$

In this formula, V0 is a velocity of the train at the beginning of a corresponding stage, a is a resultant acceleration of the traction of the train and the gravity from stage X0 to stage X1, and α is a gravity acceleration from stage X1 to stage X2. Here, X0 is a train position at the time when the train issues an emergency braking command; X1 is a position of the train at the time of traction removal; and X2 is a train position at which the braking is applied actually.

In step B, calculating an emergency braking rate switching point specifically involves that:

the train has different emergency braking rates at different operation velocities, with different braking rates corresponding to different decelerations $\beta_x$. The value of $\beta_x$ varies depending on the interval in which V is located. When the train travels on tracks in different conditions, $\beta_x$ also varies. For example, compared with a dry track, a wet track due to low adhesion coefficient may lead to reduced braking capacity, and the braking deceleration is also reduced correspondingly. The corresponding content is introduced in books related to traction braking, and will not be illustrated in detail here. Generally, an open-air section is calculated as the wet track, and a tunnel section is calculated as the dry track, which can be marked by means of a line map. The specific values of $\beta_x$ for different velocity intervals and different track conditions are provided by the train. For example, for a train having certain model, at 0-5 km/h, its dry-track emergency braking deceleration is 1.0045 m/s2, and its wet-track emergency braking deceleration is 1.0045 m/s2; at 10-15 km/h, its dry-track emergency braking deceleration is 1.2389 m/s2, and its wet-track emergency braking deceleration is 1.2348 m/s2; and at 95-100 km/h, its dry-track emergency braking deceleration is 1.3337 m/s2, and its wet-track emergency braking deceleration is 1.0040 m/s2.

When the train is moving, the location of the track at which the train is located is identified by means of the line map, and the value of $\beta_x$ can be obtained according to the interval to which the train velocity belongs when the train is moving. For safety considerations, if a distance calculated using the following formula for a tunnel section includes part of the open-air section, relevant data is recalculated by using the value $\beta_x$ of the open-air section.

$$S_x = \frac{V_t^2 - V0^2}{2\beta}.$$

In this formula, Vt is the minimum value of the velocity interval, V0 is the initial velocity value of the velocity interval, and a negative number is taken as the deceleration value $\beta$.

In step C, calculating the work of braking $W_{bx}$ of the train within a current deceleration interval specifically involves:

$$W_{bx} = \int_{Sx0}^{Sxt} \left( M_{train} \cdot \beta_x + \frac{J}{R^2} \beta_x \right) \partial X.$$

In this formula. $M_{train}$ is the mass of the train, J is the rotational inertia of the train, and R is the wheel radius.

In step D, repeating step B to step C after entering a next deceleration interval, until the velocity is zero specifically involves that: after the velocity of the train decreases to a new deceleration interval by application of emergency braking, $\beta_x$, $S_x$, and $W_{bx}$ are calculated by using new parameters.

In step E, accumulating the work of emergency braking force in all portions to act as total work of braking force $W_{braking}$ specifically involves:

$$W_{bracking} = \sum_0^n W_{bx}.$$

The above description introduces the embodiments of the method, and the solutions of the present invention will be further illustrated below by means of the embodiments of an electronic device and a storage medium.

The electronic device of the present invention includes a central processing unit (CPU), which may execute various proper actions and processing according to a computer program instruction stored in a read-only memory (ROM) or loaded from a memory unit into a random-access memory (RAM). In the RAM, there may be stored various programs and data necessary for operating the device. CPU, ROM, and RAM are connected to each other via a bus. Input/output (I/O) interfaces are also connected to the bus.

In the device, a plurality of components connected to the I/O interfaces include: input units, for example, a keyboard, a mouse, etc.; output units, for example, various types of displayers, speakers, etc.; storage units, for example, a magnetic disk, an optical disk, etc.; and communication units, for example, a network card, a modem, a wireless communication transceiver, etc. The communication units allow the device to exchange information/data with other devices by means of a computer network such as Internet and/or various telecommunications networks.

The processing unit executes various methods (for example, S1 to S6) and processing described above. For example, in some embodiments, the methods S1 to S6 may be implemented as a computer software program, which is tangibly included in a machine-readable medium, for example, a memory unit. In some embodiments, the computer program may be partially or entirely loaded and/or installed onto a device via the ROM and/or the communication unit. When the computer program is loaded to the RAM and executed by the CPU, one or more steps of the methods S1 to S6 described above may be executed. Alternatively, in other embodiments, the CPU may be configured, by any other proper means (for example, with the aid of firmware), to execute the methods S1 to S6.

The functions described above herein may be fulfilled at least in part by one or more hardware logical components. For example, without limitation, the exemplary types of hardware logical components that can be used include: a field programmable gate array (FPGA), an application-specific integrated circuit (ASIC), an application-specific standard product (ASSP), a system-on-chip system (SOC), a load programmable logic device (CPLD), etc.

Program codes for implementing the method of the present invention may be written in one or any combination of more of programming languages. These program codes may be provided to a processor or controller of a general-purpose computer, a special-purpose computer, or other programmable data processing devices, in such a way that the program codes, when executed by the processor controller, enables the functions/operations specified in a flowchart and/or block diagram to be implemented. The program codes may be executed entirely or partially on a machine, and as a stand-alone software package, may be executed partially on a machine or remote machine, or entirely on a remote machine or a server.

In the context of the present invention, the machine-readable medium may be a tangible medium which may include or store a program for use by or in combination with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination of the above. More specific examples of the machine-readable storage medium include: an electrical connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

The above description only provides the specific embodiments of the present invention, and the protection scope of the present invention is not limited thereto. A variety of equivalent modifications or substitutions readily conceivable to a person skilled in the art within the technical scope disclosed by the present invention should be included within the protection scope of the present invention. Therefore, the protection scope of the present invention should be subjected to the protection scope of the claims.

What is claimed is:

1. A train braking control method supporting multi-stage deceleration, comprising following steps:
   step 1, calculating an initial value Ek0 of kinetic energy of a train;
   step 2, calculating work of traction force $W_{traction}$ of the train in a process from an initial position to traction removal;
   step 3, calculating work of gravity force $W_g$ of the train in a process from the initial position to a stop;
   step 4, calculating work of braking force $W_{braking}$ of the train in a process from a braking application position to the stop;
   step 5, calculating maximum allowable kinetic energy of the train among all restriction points from the initial position to a stop point;
   step 6, obtaining kinetic energy $E_k$ of the train according to following formula, determining whether the kinetic energy of the train exceeds the maximum allowable kinetic energy at the restriction point, if so, triggering emergency braking of the train, or else, operating the train normally:

$$E_k = E_{k0} + W_g + W_{traction} + W_{braking},$$

wherein a specific process of step 4 is as follows:
   step A, calculating a velocity V reached by the train after a safe response time according to a current velocity of the train;
   step B, calculating an emergency braking rate switching point;
   step C, calculating work of braking $W_{bx}$ of the train within a current deceleration interval;
   step D, repeating step B to step C after entering a next deceleration interval, until the velocity is zero; and
   step E, accumulating work of emergency braking force in all portions to act as total work of braking force $W_{braking}$.

2. The train braking control method supporting multi-stage deceleration according to claim 1, wherein a calculation formula in step 1 is as follows:

$$E_{k0} = \frac{1}{2} \cdot M_{train} V0_\square^2 + \frac{1}{2} \cdot \frac{J}{R^2} V0_\square^2,$$

n which Ek0 is the initial value of the kinetic energy of the train, $M_{train}$ is mass of the train, V0 is an initial velocity of the train, J is a rotational inertia of the train, and R is a wheel radius.

3. The train braking control method supporting multi-stage deceleration according to claim 1, wherein a calculation formula in step 2 is as follows:

$$W_{traction}(X0 \to X) = \int_{X0}^{X} \left( M_{train} \cdot \Gamma_{traction}(X) + \frac{J}{R^2} \Gamma_{traction}(X) \right) \partial X,$$

in which $W_{traction}$ is the work of traction force, $M_{train}$ is a mass of the train, $\Gamma_{traction}$ is an acceleration provided by the train when a velocity of the train is V (X), J is a rotational inertia of the train, and R is a wheel radius.

4. The train braking control method supporting multi-stage deceleration according to claim 1, wherein a calculation formula in step 3 is as follows:

$$W_g(X0 \to X) = -M_{train} \cdot g \cdot \int_{X0}^{X} (\text{gradient}(X)) \partial X,$$

in which $W_g$ is the work of gravity force, $M_{train}$ is a mass of the train, g is a gravity acceleration, and gradient (X) is a gradient of a line at X.

5. The train braking control method supporting multi-stage deceleration according to claim 1, wherein step A specifically comprises:
   obtaining the velocity V of the train at beginning of X2 by using following formula by stages:

$$V = V0 + at,$$

in which V0 is a velocity of the train at beginning of a corresponding stage, and a is a resultant acceleration of the traction force of the train and the gravity force from stage X0 to stage X1, and is a gravity acceleration from stage X1 to stage X2, wherein X0 is a train position at a time when the train issues an emergency braking command; X1 is a position of the train at a time of traction removal; and X2 is a position of the train at which the braking is applied actually.

6. The train braking control method supporting multi-stage deceleration according to claim 1, wherein specifically in step B,
   the train has different emergency braking rates at different operation velocities, with different braking rates corresponding to different decelerations Bx.

7. The train braking control method supporting multi-stage deceleration according to claim 1, wherein a calculation formula in step C is as follows:

$$W_{bx} = \int_{S_{xo}}^{S_{xt}} \left( M_{train} \cdot \beta_x + \frac{J}{R^2} \beta_x \right) \partial X,$$

in which $M_{train}$ is mass of the train, J is a rotational inertia of the train, and R is a wheel radius.

8. The train braking control method supporting multi-stage deceleration according to claim 7, wherein step D specifically comprises:
   after the velocity of the train decreases to a new deceleration interval by application of emergency braking, $\beta_x$, $S_x$, and $W_{bx}$ are calculated by using new parameters.

9. The train braking control method supporting multi-stage deceleration according to claim 1, wherein a calculation formula in step E is as follows:

$$W_{bracking} = \sum_0^n W_{bx},$$

in which $W_{bx}$ is the work of braking force during emergency braking of the train.

10. The train braking control method supporting multi-stage deceleration according to claim 1, wherein the method comprise: calculating the work of braking force in an emergency braking process by making full use of accurate braking deceleration values of the train at different velocities and under different track conditions.

11. An electronic device, comprising a memory storing a computer program thereon and a processor, wherein the processor, when executing the computer program, implements the method according to claim 1.

12. A non-transitory computer-readable storage medium storing a computer program thereon, wherein the computer program, when executed by a processor, implements the method according to claim 1.

* * * * *